United States Patent [19]
Yoon

[11] Patent Number: 6,154,327
[45] Date of Patent: Nov. 28, 2000

[54] TWO-DIMENSIONAL DRIVING APPARATUS AND METHOD

[75] Inventor: Si-young Yoon, Sungnam, Rep. of Korea

[73] Assignee: SamSung Thomson-CSF Systems Co., Ltd., Kumi, Rep. of Korea

[21] Appl. No.: 09/366,561

[22] Filed: Aug. 4, 1999

[30] Foreign Application Priority Data

Aug. 14, 1998 [KR] Rep. of Korea ...................... 98/33067

[51] Int. Cl.[7] .................................................. G02B 7/02
[52] U.S. Cl. ........................ 359/819; 359/822; 359/813; 359/814
[58] Field of Search .................... 359/822, 819, 359/813, 814, 824

[56] References Cited

U.S. PATENT DOCUMENTS

| | | | |
|---|---|---|---|
| 4,353,634 | 10/1982 | Himmelsbach | 354/195 |
| 4,558,367 | 12/1985 | Urata et al. | 358/227 |
| 4,566,843 | 1/1986 | Iwatsuka et al. | 414/680 |
| 4,789,225 | 12/1988 | Nomura | 350/255 |
| 4,896,951 | 1/1990 | Atsuta et al. | 350/429 |
| 4,998,135 | 3/1991 | Hyodo | 355/56 |
| 5,075,719 | 12/1991 | Hyodo | 355/55 |
| 5,172,276 | 12/1992 | Ueyama et al. | 359/813 |
| 5,477,296 | 12/1995 | Takamura et al. | 354/195.1 |
| 5,680,649 | 10/1997 | Akimoto et al. | 396/132 |
| 5,696,999 | 12/1997 | Matsushima et al. | 396/55 |
| 5,798,875 | 8/1998 | Fortin et al. | 359/813 |

*Primary Examiner*—Georgia Epps
*Assistant Examiner*—Timothy Thompson
*Attorney, Agent, or Firm*—Robert E. Bushnell, Esq.

[57] ABSTRACT

A two-dimensional driving apparatus including: a plurality of support wires for elastically supporting a movable mount; a first driving device connected to the movable mount by a first driving wire capable of being elastically deformed for linearly moving the movable mount in a first direction; and a second driving device connected to the movable mount by a second driving wire capable of being elastically deformed, and installed at the same height of the first driving device for linearly moving the movable mount in a second direction perpendicular to the first direction.

30 Claims, 3 Drawing Sheets

TWO-DIMENSIONAL DRIVING APPARATUS AND METHOD

CLAIM OF PRIORITY

This application makes reference to, incorporates the same herein, and claims all benefits accruing under 35 U.S.C. §119 from my application 2-AXIS ACTUATOR filed with the Korean Industrial Property Office on Aug. 14, 1998 and there duly assigned Ser. No. 33067/1998.

BACKGROUND OF THE INVENTION

1. Field of the Invention

The present invention relates to a two-dimensional driving apparatus for moving an object in an X-Y plane.

2. Description of the Related Art

In general, an optical apparatus such as a CCD (charge coupled device) camera is provided with a two-dimensional driving apparatus for moving an optical lens in an X-Y plane to precisely position it over an object to be photographed. That is, X-axis and Y-axis members are disposed to be perpendicular to each other, and an optical lens mount is installed to be capable of moving in the X-Y plane. However, since the X-axis member is installed on the Y-axis member or vice versa, the member disposed beneath the other one is subjected to more load and the driving force required to move the members is increased, and accordingly, it is difficult to carry out prompt movement control.

U.S. Pat. No. 4,353,634 to Himmelsbach entitled Focusing Mechanism For Camera Objective, discloses a front component of a varifocal camera objective, axially shiftable for focusing purposes, is provided with a lens mount held by an axially extending guide rod which is slidably received in an inner annular flange and an end wall of a lens barrel. It is disclosed the lens mount has a pin projecting through an axial guide slot in the lens barrel into a camming groove in a surrounding milled setting ring. A rearward extension of the guide rod, nonrotatable but axially slidable with reference thereto against the force of a tension spring, is provided with male threads engaged by a drive nut held captive in the end wall, the nut being provided with outer gear teeth meshing with a pinion which is driven by a reversible electric motor via a slipping clutch. It is disclosed upon retraction of the threaded extension by the drive nut, the tension spring holds the pin of that lens mount against the rear edge of its camming groove; the width of that groove and the axial length of the guide slot are sufficient to let the motor drive the lens mount over at least part of the available focusing range in a given position of the setting ring.

U.S. Pat. No. 4,558,367 to Urata, et al. entitled Automatic Focusing Device For Video Camera, disclose an automatic focussing device for a video camera in which the distance between a lens mounting section of a camera body and the imaging plane of an imaging unit is varied for focussing by moving at least either a lens mounting section or the imaging plane along the optical axis. U.S. Pat. No. 4,566,843 to Iwatsuka, et al. entitled Multiarticulated Manipulator, disclose a multiarticulated manipulator including a multijoint connecting mechanism having a plurality of arms, each arm having a joint capable of being bent in one plane and all the arms being connected with one another in positions spaced apart from one another by a circumferential extent of 90 degrees. It is disclosed a plurality of wires are provided, each wire being connected to one of the arms and all the wires being supported and guided by wire guides and driven by a drive. It is disclosed the multiarticulated manipulator incorporated in a movable type remoted-controlled visual monitor system further includes a lens fixed to a forward end of the multijoint connecting mechanism, a fiberscope connected to the lens, and a movable member having the drive mounted therein and supporting the multijoint connecting mechanism, and a camera mounted in the movable member and connected to the lens through the fiberscope.

U.S. Pat. No. 4,789,225 to Nomura entitled Device For Driving A Lens Unit Having A Tripod Mount, discloses a drive mechanism for a lens unit with a tripod mount. It is disclosed the tripod mount is on a stationary cylinder while the camera mount is on a rotatable cylinder which contains a drive shaft for mechanically driving a lens axially movable along the stationary cylinder. It is disclosed a drive gear supported by the stationary cylinder causes the linear movement of the lens by its rotation. A planetary gear system, coupled to the stationary cylinder connects the drive shaft and the drive gear.

U.S. Pat. No. 4,896,951 to Atsuta, et al. entitled Lens Mount Assembly, disclose a lens mount assembly for use in a photographic camera, a video camera and other various optical instruments having a barrel supporting mechanism adapted to slidably support a front section of the lens mount assembly and further provides the lens mount assembly with a simplified dust-proof mechanism utilizing a floating ring.

U.S. Pat. No. 4,998,135 to Hyodo entitled Mechanism For Moving A Projection Lens Assembly To Alter Projecting Magnification discloses a mechanism for curvedly moving a projection lens assembly accommodated in a lens barrel to alter a projecting magnification of a projecting optical system including a support member for supporting a lens barrel accommodating a projection lens assembly, a movable member for holding thereon the support member so that the IL support member is movable in a first direction, the movable member being movable in a second direction, a guide member in the form of a plate fixedly mounted below the movable member for restricting the position of the support member in the first direction and for guiding the movable member in the second direction. The mechanism is also disclosed as including a drive unit for moving the movable member to an appropriate location corresponding to an altered projecting magnification. It is disclosed the drive unit includes a plurality of pulleys, an endless wire passed about these pulleys and a stepping motor coupled with one of the pulleys.

U.S. Pat. No. 5,075,719 to Hyodo entitled Lens Driving Device, discloses a lens driving device having a lens mount integrated with a lens as a unit, a drive rope with convex stripes on its surface, pulleys disposed on the lens mount and having gear tooth channels which engage the convex stripes formed on the drive rope, lens drive gears disposed on the lens mount and having a drive linkage to the pulleys respectively, and a lens guide member with a rack portion which engages with the lens drive gears. It is disclosed the pulleys rotate with the movement of the drive rope and the drive gears rotate interlocking with the rotation of the pulleys so as to move the lens mount along the lens guide member. It is disclosed in the case of using a zoom lens with a zoom ring, the lens driving device has a gear tooth channel formed on the zoom ring which engages with the convex stripes formed on the drive rope so as to rotate the zoom ring in accordance with the movement of the drive rope.

U.S. Pat. No. 5,172,276 to Ueyama, et al. entitled Structure For Stabilizing Image In Optical System, disclose a structure for preventing an image being shaken when a vibration occurs in an optical system so as to stabilize the object, wherein a compensating lens is incorporated in a third lens group of a lens barrel constituting the optical system. It is disclosed the compensating lens is allowed to move within the third lens group and only in a direction perpendicular to the optical axis. A pulse motor mounted on a fixed barrel drives the compensating lens. It is disclosed the rotation of the pulse motor is converted into the rotation of an interlocking lever, the interlocking lever being a straight bar having an uncircular sectional configuration, and a driving lever having approximately the same configuration as the sectional configuration of the interlocking lever is slidably inserted thereinto. It is disclosed the driving lever rotates together with the interlocking lever, and one end of the driving lever penetrates through the frame of the third lens group, thus contacting the head portion of a pin which presses the compensating lens. It is disclosed when the driving lever rotates, the compensating lens is pressed through the pin. At a position opposed to the pin, a plate urged by a leaf spring supports the compensating lens. It is disclosed a mechanism for driving the compensating lens is provided in the x-direction and the y-direction with respect to the compensating lens. It is disclosed when the driving lever rotates in the opposite direction, the compensating lens is moved to the initial position by the elastic force of a leaf spring.

U.S. Pat. No. 5,477,296 to Takamura, et al. entitled Camera With A Variable Focus Lens Device, disclose a camera with a variable focus lens device, in which a lens position detecting device detects the focal length of the photographing lens from the amount of movement of a movable member that is capable of being rectilinearly advanced and retracted along the optical axis of the photographing lens, in order to provide an autofocusing function to focus upon an object. It is disclosed a key member prevents rotation of a movable lens mount and so allows the movable lens mount to be advanced or retracted a lesser distance than the movable lens mount.

U.S. Pat. No. 5,680,649 to Akimoto, et al. entitled Lens Driving Device For Auto-Focus Camera, disclose a lens driving device including a lens driving member mounted for rotation between an initial position and a preselected focus position, an urging member for urging the lens driving member in a first direction of rotation to control a rotational position of the lens driving member in accordance with the preselected focus position, and a ratchet operably rotatable with the lens driving member. It is disclosed a retaining member is mounted for back and forth rocking movement and has retaining portions for alternate engagement with the ratchet during back and forth rocking movement of the retaining member. A control mechanism controls the rocking movement of the retaining member. It is disclosed a holding member holds the lens driving member from rotation is a second direction of rotation opposite to the first direction of rotation when the lens s driving member is in the initial position.

SUMMARY OF THE INVENTION

To solve the above problems, it is an objective among other objectives of the present invention to provide a two-dimensional driving apparatus capable of prompt movement control by supporting a movable mount by X-axis and Y-axis members in a balanced manner.

Accordingly, to achieve the above objective and other objectives, of the present invention, there is provided a two-dimensional driving apparatus comprising: a plurality of support wires for elastically supporting a movable mount; a first driving device connected to the movable mount by a first driving wire capable of being elastically deformed for linearly moving the movable mount in a first direction; and a second driving device connected to the movable mount by a second driving wire capable of being elastically deformed, and installed at the same height as the first driving device for linearly moving the movable mount in a second direction perpendicular to the first direction.

In addition, the apparatus further comprises attenuation columns installed beneath the movable mount for attenuating vibration occurring when the movable mount elastically supported by the plurality of support wires and driven by the first driving wire and the second driving wire is moved. The plurality of support wires, the first driving wire and the second driving wire are desirably steel wires.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
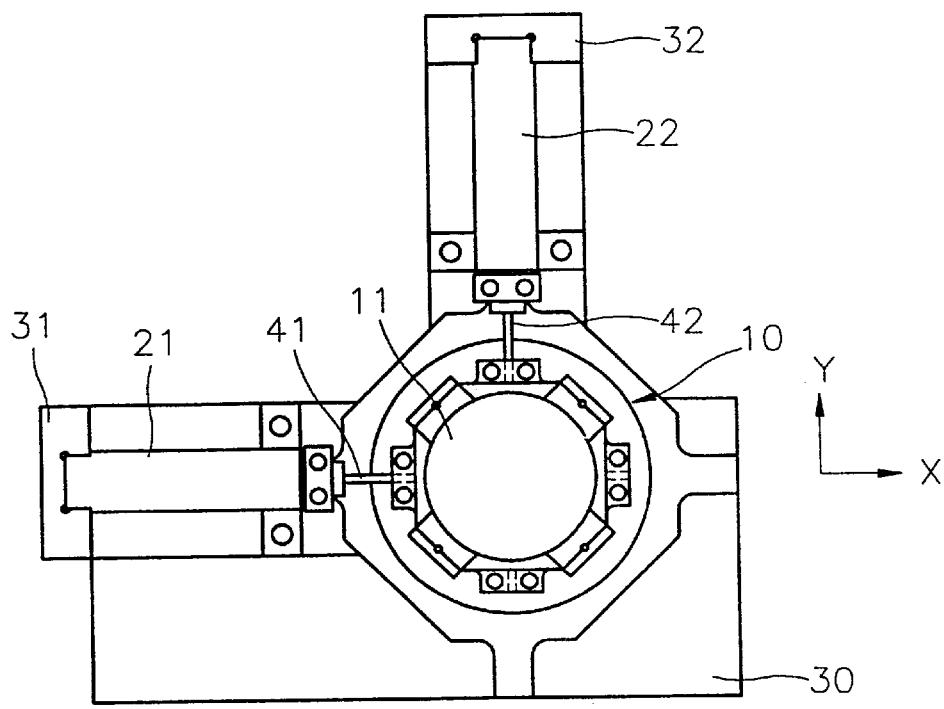
FIG. 1 is a plan view illustrating a two-dimensional driving apparatus according to the present invention.
Figure 2:
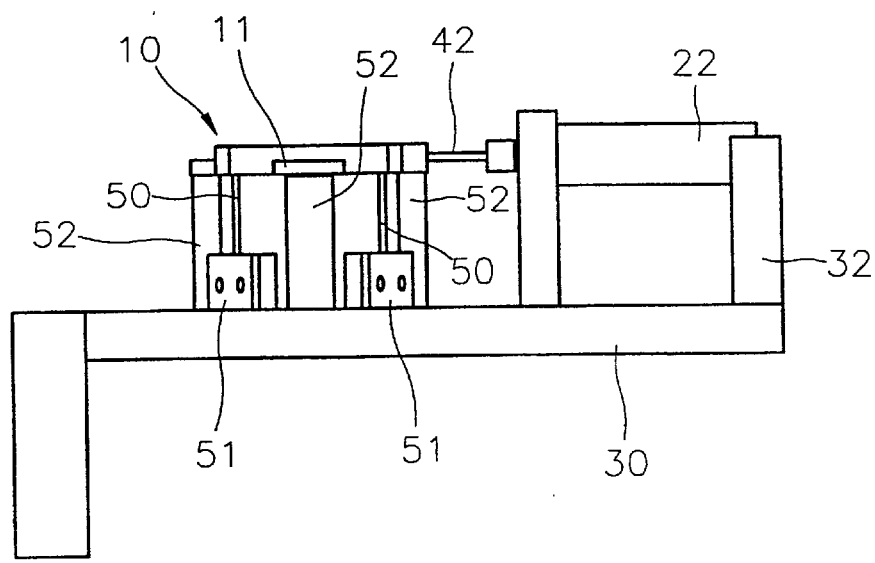
FIG. 2 is a side elevation view illustrating the two-dimensional driving apparatus of FIG. 1.
Figure 3:
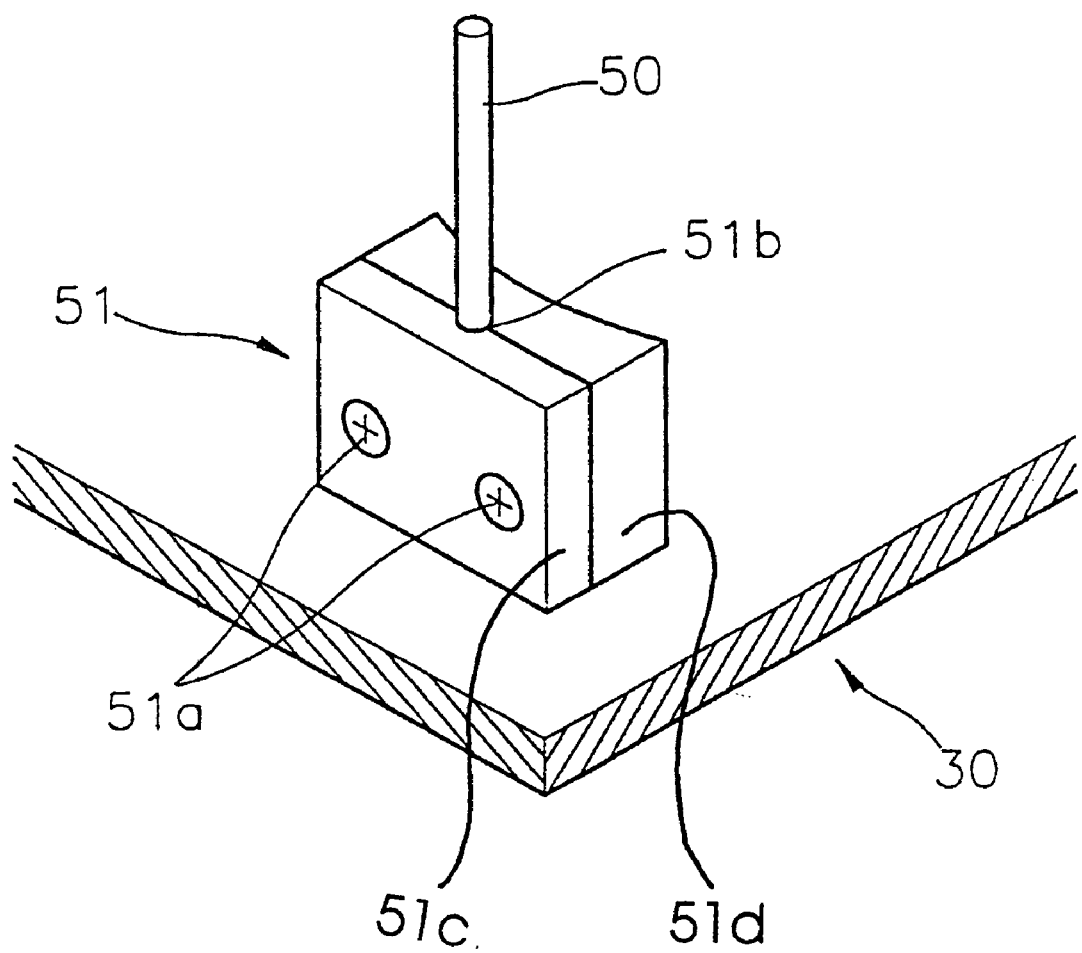
FIG. 3 is a perspective view illustrating a supporting stand employed in the two-dimensional driving apparatus of FIG. 1.

FIGS. 1 and 2 show a preferred embodiment of the present invention. Referring to FIGS. 1 and 2, a movable mount 10 on which an optical lens 11 is mounted is elastically supported by a plurality of support 50 members, such as support steel wires with the plurality of support members 50 elastically supporting the movable mount 10 in a direction different from the X axis and Y axis directions of FIG. 1, such as illustrated in FIGS. 2 and 3. One end of each support member 50, such as a steel wire, is fixed to the movable mount 10 and the other end is fixed to a corresponding support stand 51 fixedly installed on a base 30. As shown in FIG. 3, the support stand 51 includes two detachable members 51c and 51d assembled by fixing members such as screws 51 a, and the other end of a support member 50, such as steel wire, of the plurality or support members 50 is inserted into a fixing hole 51b formed between the two detachable members 51c and 51d. Preferably, the support steel wire 50 is firmly fixed in the two detachable members 51c and 51d by injecting a high viscosity material into a gap between the support steel wire 50 and the fixing hole 51b.

Continuing with reference to FIGS. 1 and 2, the movable mount 10 is connected to a first driving device 21 and a second driving device 22 by a first driving member 41 and a second driving member 42, such as driving steel wires, respectively. The first driving device 21 and the second driving device 22 are respectively disposed in X-axis and Y-axis directions to be perpendicular to each other and are supported by holders 31 and 32 of the base 30, respectively. In this state, the first driving device 21 can move the movable mount 10 in an X-axis direction and the second driving device 22 can move the movable mount 10 in a Y-axis direction.

The first driving device 21 and the second driving device 22 can each include a solenoid employing a push bar as the first driving member 41 and the second driving member 42. Alternatively, the first driving device 21 and the second driving device 22 can each employ a piezoelectric element as the first driving member 41 and the second driving member 42 to move the movable mount 10. At this time, the movable mount 10 can be respectively moved by expansion or contraction of the piezoelectric elements as current to the piezoelectric elements as from the first driving device 21 and the second driving device 22 is supplied or broken. In any case, the support members 50, such as steel wires, and the first driving member 41 and the second driving member 42, such as driving steel wires, must be made of materials capable of deforming in the X and Y directions of FIG. 1. Accordingly, when, for example, the first driving device 21 moves the movable mount 10 in the X-axis direction, not only the support members 50, such as steel wires, but the second driving member 42, such as a driving steel wire, of the second driving device 22 is elastically bent while supporting the movable mount 10.

In addition, a plurality of attenuation columns 52 are installed beneath the movable mount 10. The attenuation columns 52 are intended to attenuate vibration occurring when the movable mount 10 elastically supported by the support members 50, such as steel wires, is moved. That is, even though the movable mount 10 trembles, the movable mount 10 contacts the upper sides of the attenuation columns 52, and therefore the width of vibration is decreased quickly.

On the other hand, the vibration occurring when the movable mount 10 elastically supported by the support members 50, such as steel wires, is moved will be described with reference to FIGS. 1 through 4B.

Figure 4A:
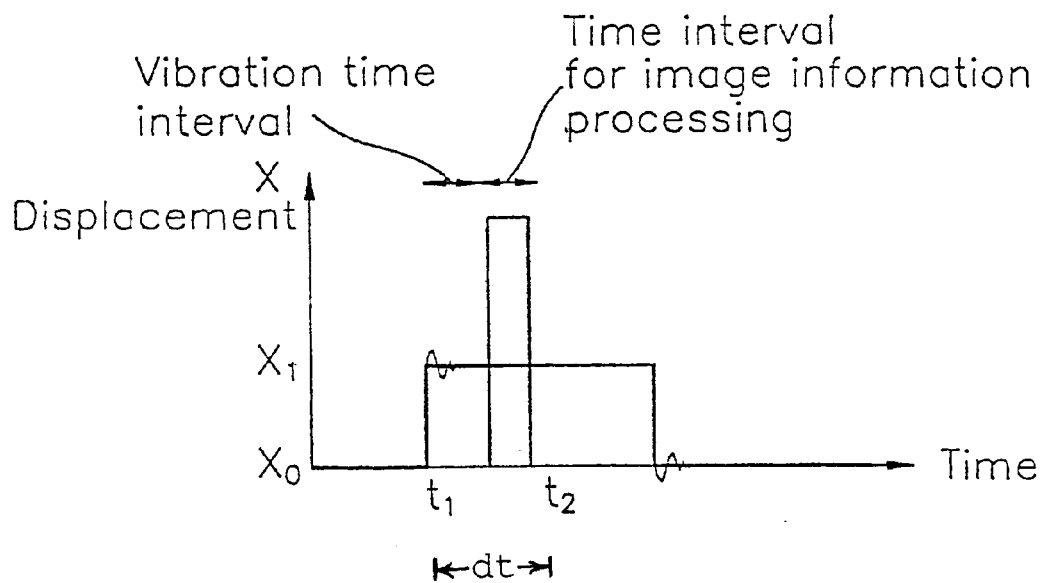
FIGS. 4A and 4B are graphs illustrating a vibration time interval required for attenuating vibration occurring when the two-dimensional driving apparatus according to the present invention is moved in the X-axis direction (FIG. 4A) and in the Y-axis direction (FIG. 4B), respectively.
Figure 4B:
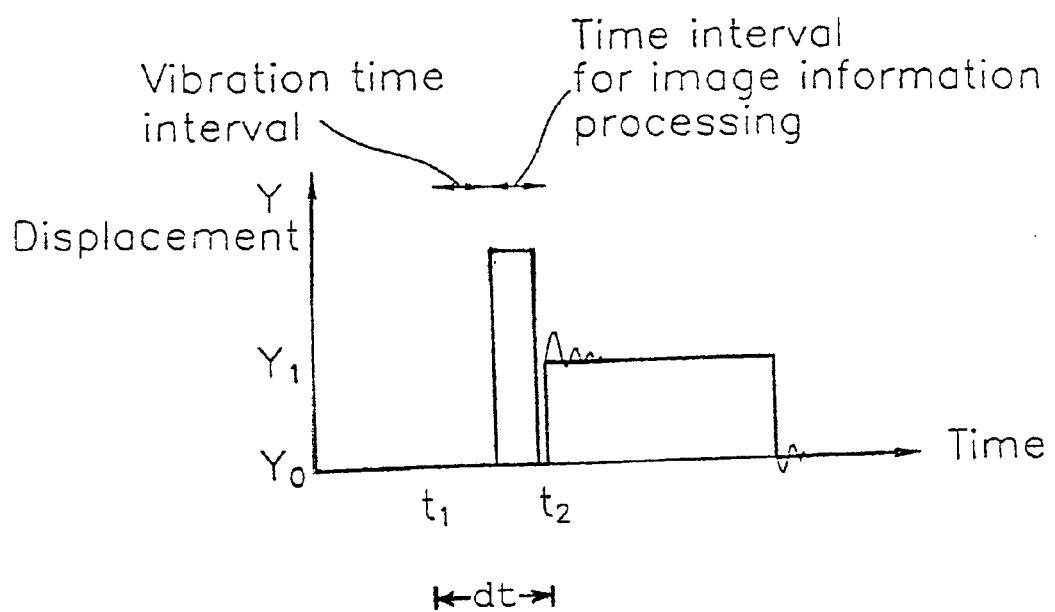

In the operation of the two-dimensional driving apparatus according to the present invention, the movable mount 10 is moved first, for example, along the X-axis by a desired distance, and then moved along the Y-axis by a desired distance, the X axis direction and Y axis direction being illustrated in FIG. 1. At this time, as shown in FIGS. 4A and 4B, the movable mount 10 vibrates for a predetermined time from a point in time t1 when the movable mount 10 has been displaced from $X_0$ to $X_1$ in the X axis direction due to the elastic forces of the support members 50, such as support steel wires (FIGS. 2 and 3), and the driving members 41 and 42, such as driving steel wires. Therefore, image information through the optical lens 11 is processed when such vibration is attenuated by the attenuation columns 52 and the movable mount 10 becomes completely still.

Then, continuing with reference to FIGS. 1, 4A and 4B, at a point in time t2 after the image information processing is finished, the movable mount 10 is moved from $Y_0$ to $Y_1$ in the Y axis direction. At this time, as in the above case, image information is processed when such vibration of the movable mount 10 is completely attenuated.

Here, when a time interval between the point in time t1 when the movable mount 10 has been or is displaced from $X_0$ to $X_1$ in the X-axis direction and the point in time t2 when the movable mount 10 begins to be or is displaced from $Y_0$ to $Y_1$ in the Y-axis direction is dt, a time interval for attenuating vibration is usually defined as dt/2. In addition, the higher the frequency of vibration of the driving system is, the faster the vibration is attenuated, and the time interval for attenuating vibration is reduced. Therefore, when the frequency of vibration of the driving system including the support members 50, such as support steel wires, and the driving members 41 and 42, such as driving steel wires, is fn, the length and diameter of each support member and driving member, such as steel wires, are determined to satisfy an inequality fn >5/(dt/2). If the support members 50 and the driving members 41 and 42, such as of steel wires, which meet such a condition satisfying this inequality are employed, faster control can be realized since the vibration of the movable mount 10 is attenuated faster. Further, it is preferable that the support members 50, such as steel wires, are each made of a material of a sufficiently high resistance to wrinkling or fatigue stress, taking into consideration the weight of the movable mount 10.

According to the present invention, since the driving members 41 and 42, such as steel wires, do not overlap or cross and are disposed in the same plane, any one driving member 41 or 42, such as a steel wire, being subjected to excessive load is prevented, thereby providing fast control of movement in the X and Y directions.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A two-dimensional driving apparatus, comprising:
   a plurality of support wires for elastically supporting a movable mount;
   a first driving device connected to the movable mount by a first driving wire capable of being elastically deformed for moving the movable mount in a first direction; and
   a second driving device connected to the movable mount by a second driving wire capable of being elastically deformed, the second driving device being installed at a same height as the first driving device, for moving the movable mount in a second direction perpendicular to the first direction, with the plurality of support wires elastically supporting the movable mount in a direction different from the first direction and different from the second direction.

2. A two-dimensional driving apparatus, comprising:
   a plurality of support wires for elastically supporting a movable mount;
   a first driving device connected to the movable mount by a first driving wire capable of being elastically deformed for moving the movable mount in a first direction;
   a second driving device connected to the movable mount by a second driving wire capable of being elastically deformed, the second driving device being installed at a same height as the first driving device, for moving the movable mount in a second direction perpendicular to the first direction; and a plurality of attenuation columns installed beneath the movable mount for attenuating vibration occurring when the movable mount elastically supported by the plurality of support wires and the first driving wire and the second driving wire is moved.

3. The two-dimensional driving apparatus as claimed in claim 2, further comprised of the plurality of support wires being steel wires, the first driving wire being a steel wire, and the second driving wire being a steel wire.

4. The two-dimensional driving apparatus as claimed in claim 1, further comprised of the plurality of support wires being steel wires, the first driving wire being a steel wire, and the second driving wire being a steel wire.

5. The two-dimensional driving apparatus as claimed in claim 1, further comprised of the two-dimensional driving apparatus being for use in a camera.

6. The two-dimensional driving apparatus as claimed in claim 5, further comprised of the movable mount being for mounting an optical lens.

7. The two-dimensional driving apparatus as claimed in claim 1, further comprised of the two-dimensional driving apparatus being for use in a charge coupled device (CCD) camera.

8. A two-dimensional driving apparatus, comprising:

a plurality of support wires for elastically supporting a movable mount;

a first driving device connected to the movable mount by a first driving wire capable of being elastically deformed for moving the movable mount in a first direction; and a second driving device connected to the movable mount by a second driving wire capable of being elastically deformed, the second driving device being installed at a same height as the first driving device, for moving the movable mount in a second direction perpendicular to the first direction, and further comprised of the frequency of vibration of the two-dimensional driving apparatus being fn>5/(dt/2), where:

fn is the frequency of vibration of the two-dimensional driving apparatus including the plurality of support wires and the first driving wire and the second driving wire, and dt/2 is a time interval for attenuating vibration with dt being a time interval between a point in time when the movable mount is displaced in the first direction and a point in time when the movable mount is displaced in the second direction.

9. A two-dimensional driving apparatus, comprising:

a plurality of support members for elastically supporting a movable mount;

a first driving device connected to the movable mount by a first driving member capable of being elastically deformed for moving the movable mount in a first direction; and a second driving device connected to the movable mount by a second driving member capable of being elastically deformed, the second driving device being installed at a same height as the first driving device, for moving the movable mount in a second direction perpendicular to the first direction, with the plurality of support members elastically supporting the movable mount in a direction different from the first direction and different from the second direction.

10. A two-dimensional driving apparatus comprising:

a plurality of support members for elastically supporting a movable mount;

a first driving device connected to the movable mount by a first driving member capable of being elastically deformed for moving the movable mount in a first direction;

a second driving device connected to the movable mount by a second driving member capable of being elastically deformed, the second driving device being installed at a same height as the first driving device for moving the movable mount in a second direction perpendicular to the first direction; and a plurality of attenuation columns installed beneath the movable mount for attenuating vibration occurring when the movable mount elastically supported by the plurality of support members and the first driving member and the second driving member is moved.

11. The two-dimensional driving apparatus as claimed in claim 10, further comprised of the plurality of support members comprising steel, the first driving member comprising steel, and the second driving member comprising steel.

12. The two-dimensional driving apparatus as claimed in claim 10, further comprised of the first driving member comprising a piezoelectric element and the second driving member comprising a piezoelectric element.

13. The two-dimensional driving apparatus as claimed in claim 9, further comprised of the plurality of support members comprising steel, the first driving member comprising steel, and the second driving member comprising steel.

14. The two-dimensional driving apparatus as claimed in claim 9, further comprised of the first driving member comprising a piezoelectric element and the second driving member comprising a piezoelectric element.

15. The two-dimensional driving apparatus as claimed in claim 9, further comprised of the two-dimensional driving apparatus being for use in a camera.

16. The two-dimensional driving apparatus as claimed in claim 15, further comprised of the movable mount being for mounting an optical lens.

17. The two-dimensional driving apparatus as claimed in claim 9, further comprised of the two-dimensional driving apparatus being for use in a charge coupled device (CCD) camera.

18. A two-dimensional driving apparatus, comprising:

a plurality of support members for elastically supporting a movable mount;

a first driving device connected to the movable mount by a first driving member capable of being elastically deformed for moving the movable mount in a first direction; and a second driving device connected to the movable mount by a second driving member capable of being elastically deformed, the second driving device being installed at a same height as the first driving device, for moving the movable mount in a second direction perpendicular to the first direction, and further comprised of the frequency of vibration of the two-dimensional driving apparatus being fn>5/(dt/2), where:

fn is the frequency of vibration of the two-dimensional driving apparatus including the plurality of support members, the first driving member and the second driving member, and dt/2 is a time interval for attenuating vibration, with dt being a time interval between a point in time when the movable mount is displaced in the first direction and a point in time when the movable mount is displaced in the second direction.

19. The two-dimensional driving apparatus as claimed in claim 18, further comprised of the two-dimensional driving apparatus being for use in a camera.

20. The two-dimensional driving apparatus as claimed in claim 19, further comprised of the plurality of support members comprising steel wires, the first driving member comprising a steel wire, and the second driving member comprising a steel wire.

21. A method for driving an apparatus in two-dimensions, comprising the steps of:

elastically supporting a movable mount of the apparatus by a plurality of support members;

moving the movable mount in a first direction by a first driving device having an elastically deformable first driving member, the first driving member being connected to the movable mount; and moving the movable mount in a second direction perpendicular to the first direction by a second driving device having an elastically deformable second driving member, the second driving member being connected to the movable mount, with the plurality of support members elastically supporting the movable mount in a direction different from the first direction and different from the second direction.

22. A method for driving an apparatus in two-dimensions comprising the steps of:

elastically supporting a movable mount of the apparatus by a plurality of support members;

moving the movable mount in a first direction by a first driving device having an elastically deformable first driving member the first driving member being connected to the movable mount;

moving the movable mount in a second direction perpendicular to the first direction by a second driving device having an elastically deformable second driving member the second driving member being connected to the movable mount; and attenuating vibration occurring when the movable mount elastically supported by the plurality of the support members and the first driving member and the second driving member is moved by providing a plurality of attenuation columns installed beneath the movable mount.

23. The method of claim 22, further comprised of the plurality of support members comprising steel wires, the first driving member comprising a steel wire, and the second driving member comprising a steel wire.

24. The method of claim 22, further comprised of the first driving member including a piezoelectric element and the second driving member including a piezoelectric element.

25. The method claim 22, further comprised of said method being for use in a camera and the movable mount being for mounting an optical lens.

26. The method claim 21, further comprised of said method being for use in a camera and the movable mount being for mounting an optical lens.

27. The two-dimensional driving apparatus as claimed in claim 2, further comprised of the two-dimensional driving apparatus being for use in a camera.

28. The two-dimensional driving apparatus as claimed in claim 10, further comprised of the two-dimensional driving apparatus being for use in a camera.

29. The two-dimensional driving apparatus as claimed in claim 28, further comprised of the movable mount being for mounting an optical lens.

30. The two-dimensional driving apparatus as claimed in claim 10, further comprised of the two-dimensional driving apparatus being for use in a charge coupled device (CCD) camera.

* * * * *